(12) United States Patent
Chien

(10) Patent No.: US 7,199,350 B2
(45) Date of Patent: Apr. 3, 2007

(54) OPTICAL INPUT DEVICE WITH A LIGHT SOURCE DIE MOUNTED ON A DETECTING DIE AND MANUFACTURE METHOD THEREOF

(75) Inventor: Mao-Hsiung Chien, Hsin-Chu Hsien (TW)

(73) Assignee: PixArt Imaging Inc., Hsin-Chu Hsien (TW)

( * ) Notice: Subject to any disclaimer, the term of this patent is extended or adjusted under 35 U.S.C. 154(b) by 0 days.

(21) Appl. No.: 11/420,803

(22) Filed: May 29, 2006

(65) Prior Publication Data

US 2006/0266929 A1  Nov. 30, 2006

(30) Foreign Application Priority Data

May 31, 2005  (TW) .................. 94117851 A

(51) Int. Cl.
*G01G 5/08*    (2006.01)
*H01J 40/14*   (2006.01)
(52) U.S. Cl. .................. 250/208.2; 250/221; 345/166
(58) Field of Classification Search .............. 250/221, 250/208.2; 345/166
See application file for complete search history.

(56) References Cited

U.S. PATENT DOCUMENTS

| | | | |
|---|---|---|---|
| 6,256,016 B1 * | 7/2001 | Piot et al. ............... 345/166 |
| 6,541,762 B2 * | 4/2003 | Kang et al. .............. 250/239 |
| 6,653,714 B2 * | 11/2003 | Matsuno et al. .......... 257/588 |
| 7,045,775 B2 * | 5/2006 | Leong et al. ............. 250/239 |
| 7,116,427 B2 * | 10/2006 | Baney et al. ............. 356/498 |
| 7,148,078 B2 * | 12/2006 | Moyer et al. ............. 438/65 |
| 2003/0034441 A1 * | 2/2003 | Kang et al. ............. 250/221 |
| 2003/0205800 A1 * | 11/2003 | Kim et al. ............... 257/684 |
| 2004/0233170 A1 * | 11/2004 | Kang ...................... 345/166 |
| 2005/0094154 A1 * | 5/2005 | Baney et al. ............. 356/499 |
| 2005/0139944 A1 * | 6/2005 | Lin et al. ................ 257/432 |
| 2005/0186710 A1 * | 8/2005 | Moyer et al. ............. 438/116 |
| 2006/0114232 A1 * | 6/2006 | Choi ..................... 345/166 |
| 2006/0175687 A1 * | 8/2006 | Grewal ................... 257/666 |
| 2006/0214909 A1 * | 9/2006 | Poh et al. ................ 345/156 |
| 2006/0256086 A1 * | 11/2006 | Xie et al. ................ 345/166 |
| 2006/0266929 A1 * | 11/2006 | Chien .................... 250/214 R |

\* cited by examiner

*Primary Examiner*—John R. Lee
(74) *Attorney, Agent, or Firm*—Winston Hsu

(57) ABSTRACT

A light source die of an optical input device is mounted on a detecting die of the optical input device in order to reduce the size of the optical input device. The light source die emits light to a reflective surface, and light sensing elements formed on the detecting die sense the reflected light from the reflective surface. A control circuit of the optical input device generates corresponding navigation signals according to the output signals of the light sensing elements.

36 Claims, 6 Drawing Sheets

OPTICAL INPUT DEVICE WITH A LIGHT SOURCE DIE MOUNTED ON A DETECTING DIE AND MANUFACTURE METHOD THEREOF

BACKGROUND OF THE INVENTION

1. Field of the Invention

The present invention relates to an optical input device and a method for manufacturing an optical input device, and more particularly to an optical input device having a light source die mounted on a detecting die of the optical input device and related manufacture method of the optical input device.

2. Description of the Prior Art

In recent years, because of accuracy and convenience of optical input devices (e.g., optical mice), there are more and more people who use optical input devices. However, the conventional optical input devices still have some disadvantages that need to be overcome or improved. Please refer to FIGS. 1–2. FIG. 1 is a perspective diagram of a chip module 10 disclosed in Taiwan patent 549,490, and FIG. 2 is a cross-sectional diagram of an optical mouse 6 with the chip module 10. The chip module 10 installed in the optical mouse 6 comprises a package 2, a light emitting diode 3, a sensor unit 5, an optical set 25, and a control unit 7. The light emitting diode (LED) 3, the sensor unit 5, the optical set 25, and the control unit 7 are packaged by the package 2. The chip module 10 is plugged into a circuit board 61 of the optical mouse 6. The optical mouse 6 comprises a housing 62 and a base 63. An aperture 631 is formed on the base 63.

The package 2 has a recess 21 and a plurality of pins 23. A wire layer 22 and the LED 3 are installed on the recess 21. The light emitted from the LED 3 passes through a first light guide element 251 of the optical set 25 to a reflective surface 1. Then, the reflective surface 1 reflects the light through the aperture 631 to a second light guide element 252 of the optical set 25. Therefore, the reflected light is refracted by the second light guide element 252 to illuminate the sensor unit 5. The sensor unit 5 converts the light into corresponding image signals and transmits the image signals to the control unit 7. Then, the control unit 7 generates corresponding navigation signals according to the received image signals.

The LED 3, the sensor unit 5, the optical set 25, and the control unit 7 of the chip module of the optical mouse are packaged with the package 2 to simplify the structure of the optical mouse. However, because of the placement and manufacturing method of the LED 3, the sensor unit 5, and the control unit 7, the size of the chip module of the optical mouse cannot be reduced. Due to this size constraint, the applications of the chip module are limited.

SUMMARY OF THE INVENTION

The present invention provides an optical input device and related method to manufacture the optical input device. The optical input device comprises a detecting die having a plurality of light sensing elements for sensing light, a processor for processing signals received from the light sensing elements, and a light source die mounted on the detecting die and electrically coupled to the processor of the detecting die for generating light for the light sensing elements to detect.

The present invention provides another optical input device and related method to manufacture the optical input device. The optical input device comprises a detecting die and a light source die. The detecting die comprises a plurality of light sensing elements for sensing light, a processor for processing signals received from the light sensing elements, and a control circuit electrically coupled to the processor for controlling operations of the optical input device. The light source die is mounted on and electrically coupled to at least one of the processor and the control circuit for generating light for the light sensing elements to detect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
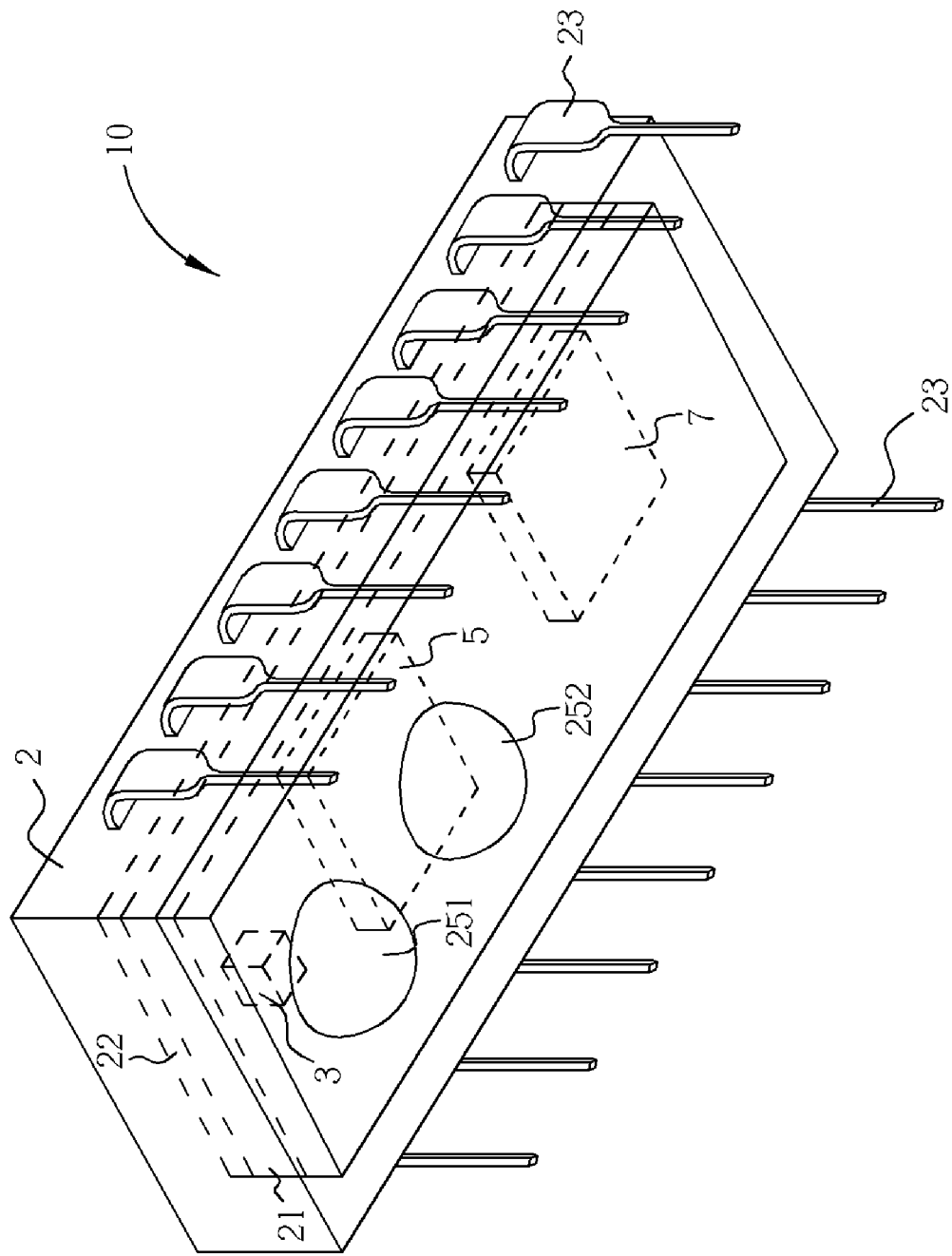
FIG. 1 is a perspective diagram of a chip module for a optical mouse according to the prior art.
Figure 2:
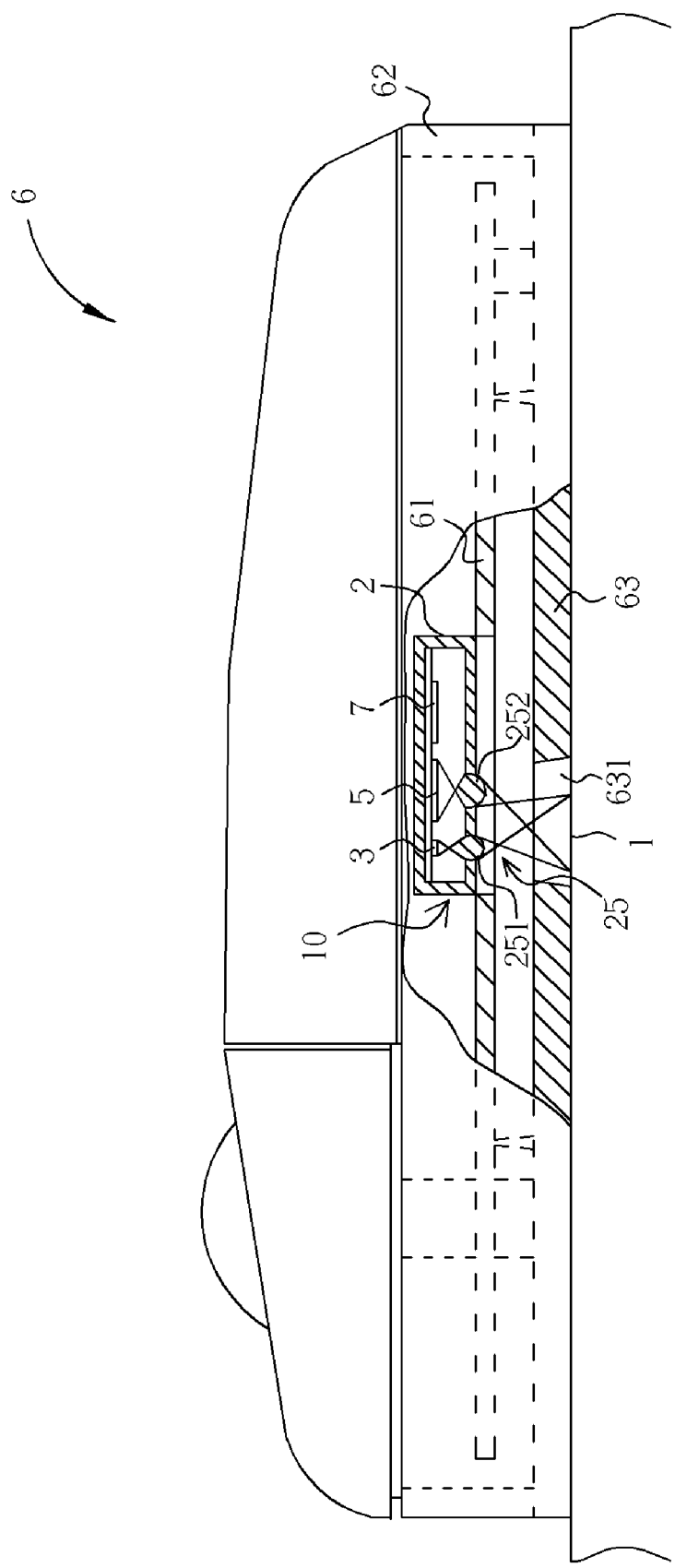
FIG. 2 is a cross-sectional diagram of an optical mouse with the chip module shown in FIG. 1.
Figure 3:
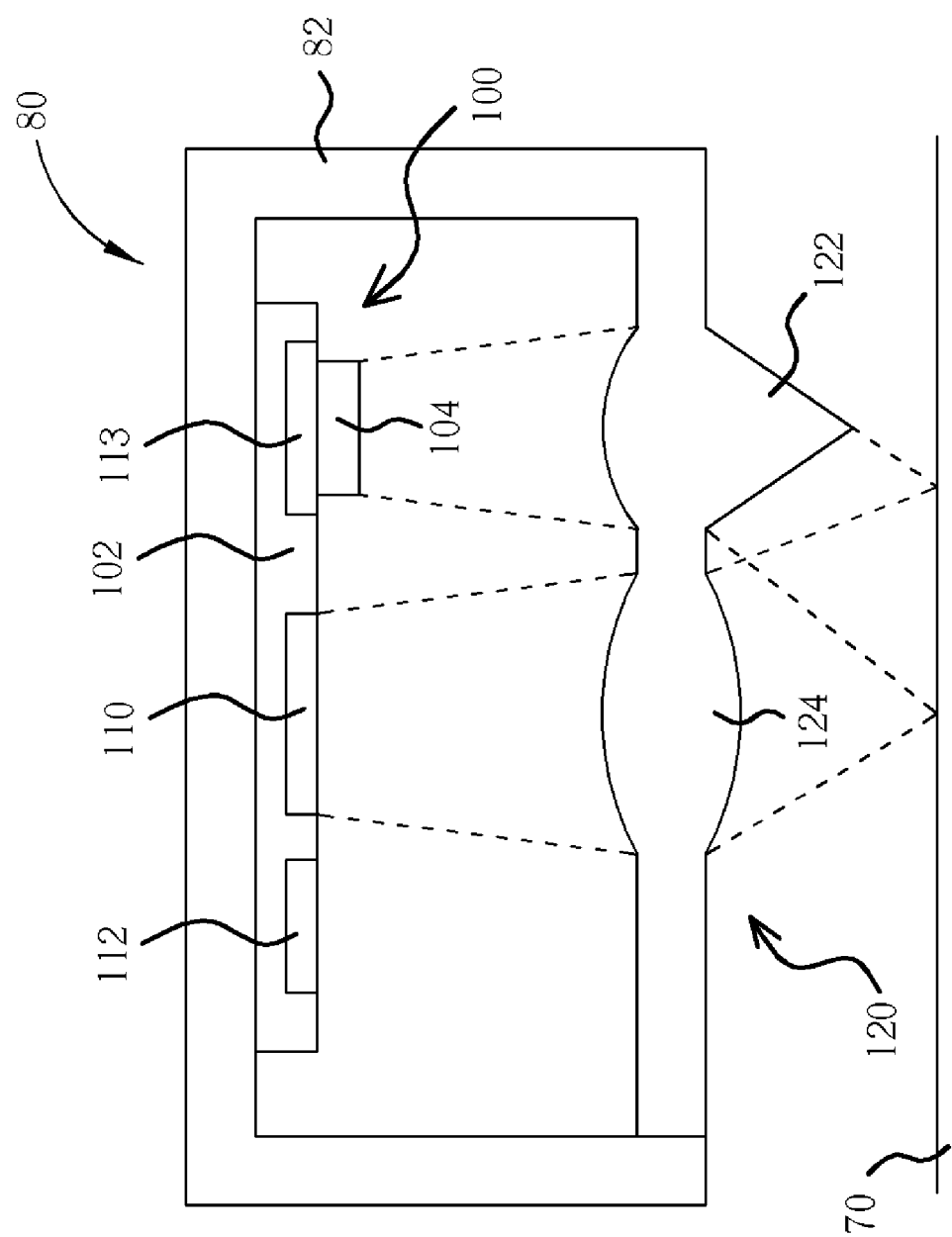
FIG. 3 is a sectional diagram of an optical input device according to the present invention.

In order to reduce the size of the chip module of the optical input device and to broaden applications of the chip module, the present invention uses a stack packaging technique to stack a light source die for emitting light on a detecting die and to package the light source die and the detecting die. Please refer to FIG. 3, which is a sectional diagram of an optical input device 80 according to the present invention. The optical input device 80 is modular. A chip module 100 and a lens set 120 of the optical input device are packaged by a package 82. The packaged optical input device 80 can be easily integrated into various electric products, for example an optical mouse, a personal digital assistant (PDA), and so on. The chip module 100 comprises a light source die 104 and a detecting die 102. The light source die 104 is used to emit light, and the detecting die 102 is a system on chip (SOC) die. A control circuit 112, a processor 113, and a light sensor array 110 are integrated on the detecting die 102. The light sensor array 110 has a plurality of light sensing elements (not shown). The light sensing elements of the light sensor array 110 sense outside light and generate corresponding image signals. The processor 113 receives the image signals from the light sensing elements and processes the image signals, and then outputs processed signals. The control circuit 112 generates corresponding navigation signals according to the processed signals from the processor 113. The lens set 120 is monolithically formed and comprises a first lens 122 and a second lens 124. The first lens 122 is positioned adjacent to the light source die 104, and the second lens 124 is positioned adjacent to the sensor array 110. The first lens 122 refracts and totally reflects the light from the light source die 104 to a working surface 70, and the second lens 124 refracts the light from the working surface 70 to the sensor array 110. Then, the light sensing elements of the sensor array 110 sense the light from the working surface 70, and the processor 113, which is electrically coupled to the light sensing elements, processes the image signals received from the light sensing elements and outputs processed signals. The control circuit 112 generates corresponding navigation signals according to the processed signals received from the processor 113. Consequently, the control circuit 112 outputs the corresponding navigation signals when relative motion between the optical input device 80 and the working surface 70 occurs.

Figure 4:
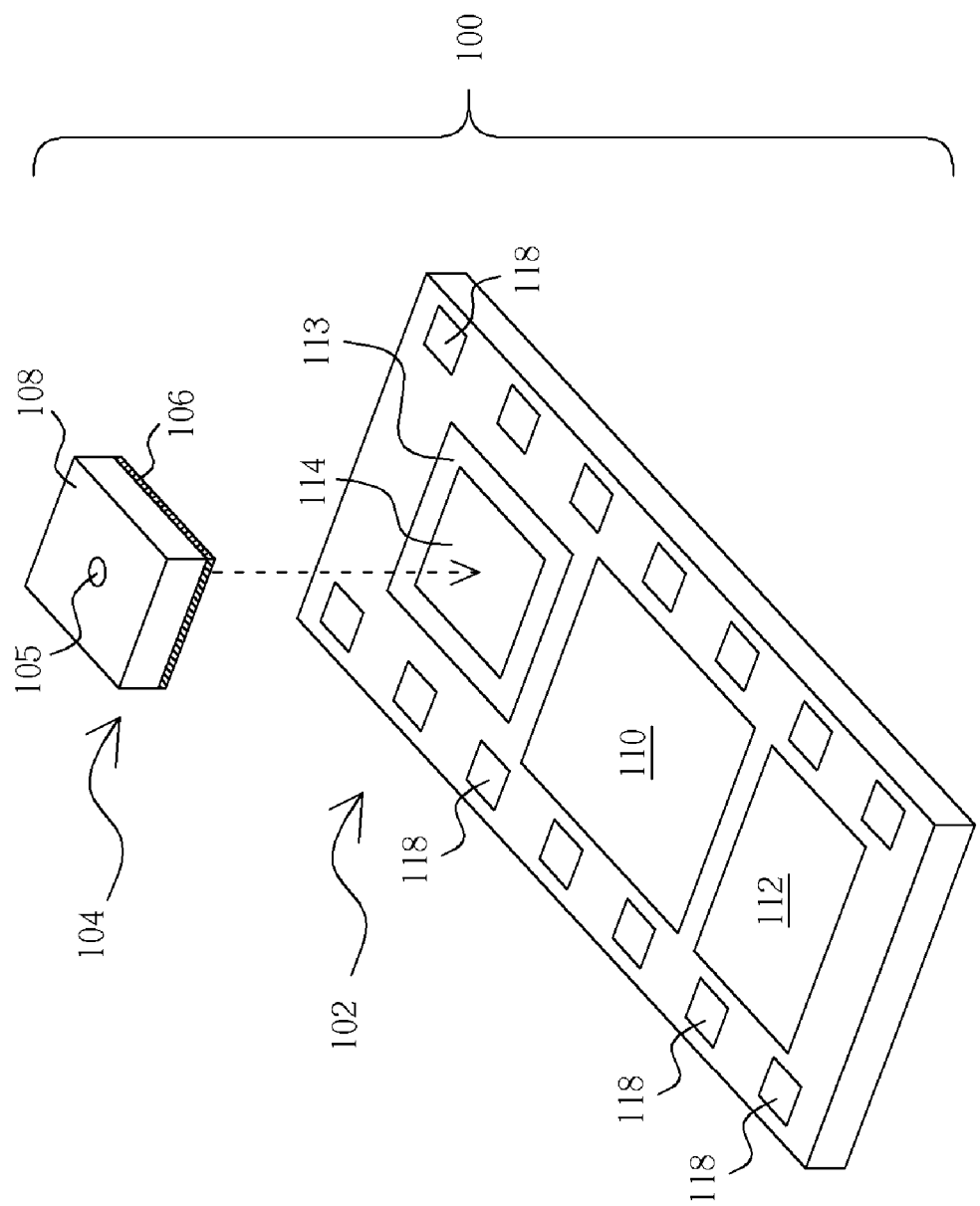
FIG. 4 is an exploded diagram of the chip module shown in FIG. 3.

Compared with the prior art, because the light source die 104 is mounted on the processor 113 of the detecting die 102 by using the stack packaging technique, the dimension of the elements of the optical input device of the present invention is decreased. Consequently, the restriction of the usage of the optical input device of the present invention is lessened, and the range of applications of the optical input device of the present invention is broadened. Please refer to FIG. 4, which is an exploded diagram of the chip module 100. In order to improve the sensing accuracy of the detecting die 102, a light source capable of emitting coherent light, such as laser diode (LD), is used as the light source die 104. In the embodiment, the light source die 104 is a vertical cavity surface emitting laser (VCSEL) diode. However, it is noted that the light source die 104 is not limited to a laser diode. The VCSEL diode 104 has a light window 105, a negative electrode 106, and a positive electrode 108. The VCSEL diode 104 emits light through the light window 105. The negative electrode 106 is coupled to a metal pad 114 of the processor 113 so that the negative system voltage can be applied to the negative electrode 106 of the VCSEL diode 104. Consequently, the VCSEL diode 104 is electrically coupled to the processor 113. After the negative electrode is coupled to the metal pad 114, a wire is connected to the positive electrode 108 to apply a system positive voltage to the positive electrode 108. Therefore, the VCSEL diode 104 can operate normally by properly biasing the electrodes of the VCSEL diode 104. In addition, there are a plurality of contact pads 118 formed on the detecting die 102. The control circuit 112 is electrically coupled to other electric devices via the contact pads 118 to transmit the navigation signals.

Figure 5:
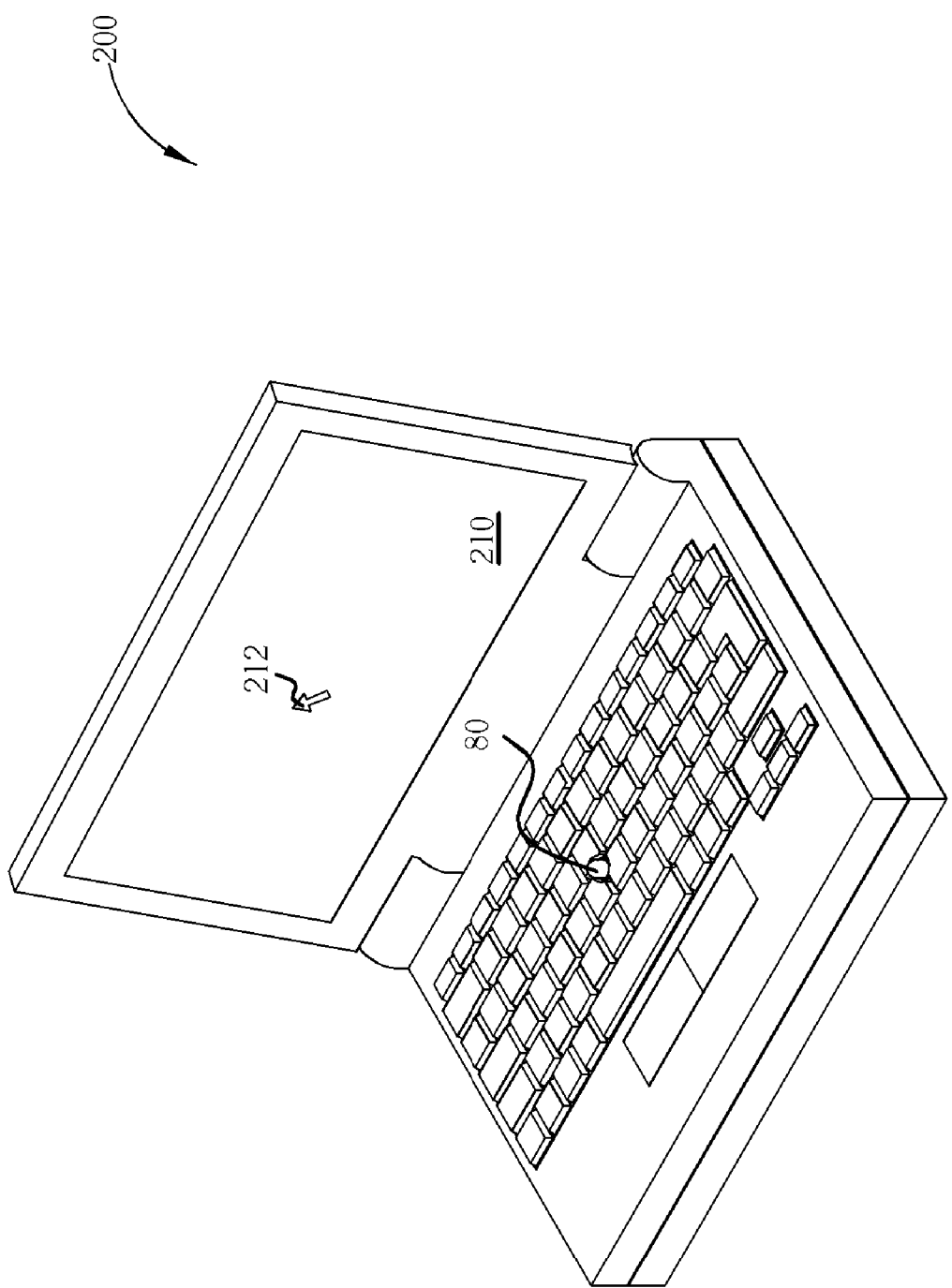
FIG. 5 is a schematic view of a notebook computer with the optical input device shown in FIG. 3.
Figure 6:
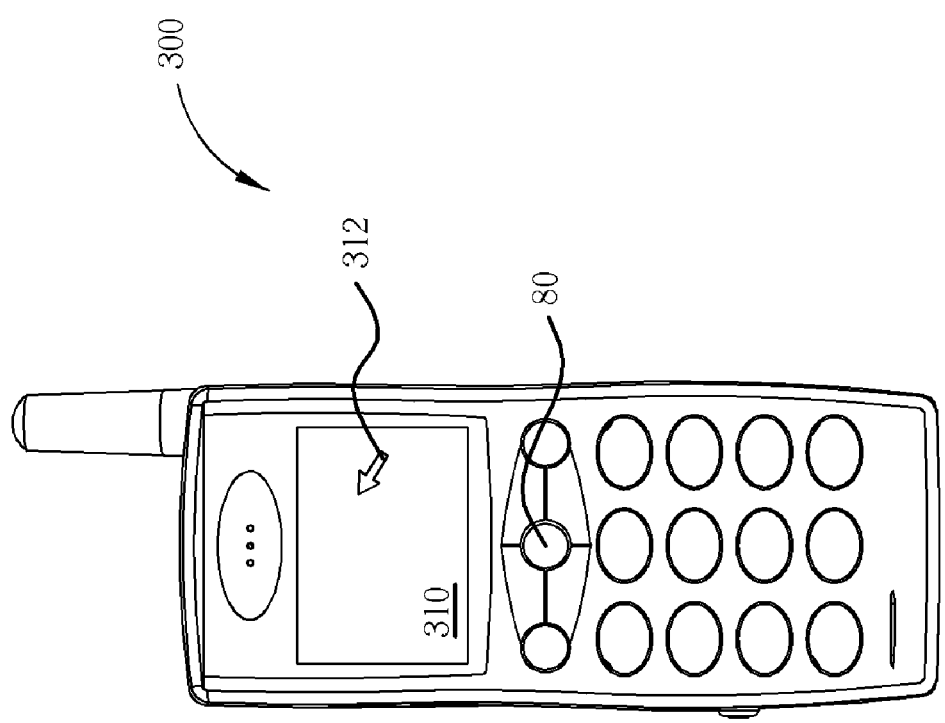
FIG. 6 is a schematic view of a cellular phone with the optical input device shown in FIG. 3.

Because the light source die 104 of the optical input device 80 is mounted on the processor 113, the size of the optical input device 80 can be effectively reduced and the optical input device 80 can be more easily implemented in other electric devices. Please refer to FIGS. 5–6. FIG. 5 is a schematic view of a notebook computer 200 with the optical input device 80, and FIG. 6 is a schematic view of a cellular phone 300 with the optical input device 80. The notebook computer 200 and the cellular phone 300 respectively comprise a screen 210 and 310. The user can touch the optical input devices 80 with the finger to make the optical input devices 80 detect the movement of the finger and generate the corresponding navigation signals to control the movement of the cursors 212 and 312 on the screens 210 and 310 respectively. It should be noted that the optical input device of the present invention is not limited by the aforementioned implementations.

In addition, even though the first lens 122 and the second lens 124 of the lens set 120 are monolithically formed in the previous embodiment, the first lens 122 and the second lens 124 may be separated and respectively positioned adjacent to the light source die 104 and the sensor array 110 in other embodiments of the present invention. Moreover, the control circuit 112 and the sensor array 110 are integrated into a detecting die 102 in the previous embodiment, but the control circuit 112 may be removed from the detecting die 102, which still comprises the sensor array 110, in other embodiments of the present invention. In addition, the optical input device 80 can be modified to make the light source die 104 be mounted on the control circuit 112 and electrically coupled to the control circuit 112. In such case, the metal pad 114 should be formed on the control circuit 112 and coupled to the negative electrode 106 of the light source die 104. In other embodiments of the present invention, the control circuit 112 and the processor 113 are integrated and formed on the same layout area of the detecting die 102. Therefore, when the light source die 104 and the detecting die 102 are stacked, the light source die 104 is mounted on the control circuit 112 and the control circuit 113 and electrically coupled to the control circuit 112 and the control circuit 113. The size of the optical input device 80 can be further reduced.

In contrast with the prior art optical input device, because the light source die of the optical input device of the present invention is mounted on the detecting die, the size of the optical input device of the present invention is reduced. The range of the applications of the optical input device of the present invention is broadened, and the optical input device can be easily integrated into various electronic products. Moreover, the light source die, the detecting die, and the lens set are packaged in a single package, so the light paths of the optical input device have been properly adjusted before leaving the factory. Therefore, the optical input device is convenient for manufacturers and designers who integrate the optical input device into their products.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical input device comprising:
   a detecting die having a sensor array with a plurality of light sensing elements for sensing light and a processor for processing signals received from the sensor array; and
   a light source die mounted on and electrically coupled to the processor of the detecting die for generating light for the light sensing elements of the sensor array to detect.

2. The optical input device of claim 1 further comprising a control circuit electrically coupled to the processor for controlling operations of the optical input device.

3. The optical input device of claim 2 wherein the control circuit is integrated on the detecting die.

4. The optical input device of claim 1 wherein the light source die is a coherent light source.

5. The optical input device of claim 4 wherein the light source die is a laser diode (LD).

6. The optical input device of claim 4 wherein the light source die is a vertical cavity surface emitting laser (VCSEL) diode.

7. The optical input device of claim 1 wherein the processor comprises a metal pad, and the light source die is fixed on the metal pad.

8. The optical input device of claim 7 wherein one electrode of the light source die is coupled to the metal pad.

9. The optical input device of claim 1 wherein the detecting die and the light source die are packaged in a package.

10. The optical input device of claim 1 further comprising a first lens positioned adjacent to the light source die for guiding the light generated by the light source die and a second lens positioned adjacent to the sensor array for guiding light to the light sensing elements of the sensor array.

11. A method for manufacturing an optical input device, the method comprising:
    (a) forming a sensor array with a plurality of light sensing elements and a processor on a detecting die in the optical input device;
    (b) forming a light source die in the optical device for emitting light; and
    (c) mounting the light source die on the processor of the detecting die and electrically coupling the light source die to the processor of the detecting die.

12. The method of claim 11 further comprising forming a control circuit for controlling operations of the processor on the detecting die.

13. The method of claim 11 wherein step (a) comprises forming a metal pad on the processor, and step (c) comprises electrically coupling one electrode of the light source die to the metal pad.

14. The method of claim 11 further comprising packaging the detecting die and the light source die in one package.

15. The method of claim 11 further comprising:
    installing a first lens adjacent to the light source die; and
    installing a second lens adjacent to the sensor array.

16. The method of claim 11 wherein step (b) is forming a laser diode (LD).

17. The method of claim 16 wherein step (b) is forming a vertical cavity surface emitting laser (VCSEL) diode.

18. An optical input device comprising:
    a detecting die comprising:
        a sensor array with a plurality of light sensing elements for sensing light;
        a processor electrically coupled to the sensor array for processing signals received from the sensor array; and
        a control circuit electrically coupled to the processor for controlling operations of the optical input device; and
    a light source die mounted on and electrically coupled to one of the processor and the control circuit for generating light for the light sensing elements of the sensor array to detect.

19. The optical input device of claim 18 wherein the light source die is mounted on and electrically coupled to the processor and the control circuit.

20. The optical input device of claim 18 wherein the light source die is a coherent light source.

21. The optical input device of claim 20 wherein the light source die is a laser diode (LD).

22. The optical input device of claim 21 wherein the light source die is a vertical cavity surface emitting laser (VCSEL) diode.

23. The optical input device of claim 18 wherein the processor comprises a metal pad, and the light source die is fixed on the metal pad.

24. The optical input device of claim 23 wherein one electrode of the light source die is coupled to the metal pad.

25. The optical input device of claim 18 wherein the control circuit comprises a metal pad, and the light source die is fixed on the metal pad.

26. The optical input device of claim 25 wherein one electrode of the light source die is coupled to the metal pad.

27. The optical input device of claim 18 wherein the detecting die and the light source die are packaged in a package.

28. The optical input device of claim 18 further comprising a first lens positioned adjacent to the light source die for guiding the light generated by the light source die and a second lens positioned adjacent to the sensor array for guiding light to the light sensing elements of the sensor array.

29. A method for manufacturing an optical input device, the method comprising:
    (a) forming a sensor array with a plurality of light sensing elements, a processor, and a control circuit on a detecting die in the optical input device;
    (b) forming a light source die in the optical device for emitting light; and
    (c) mounting the light source die on and electrically coupling the light source die to one of the processor and the control circuit.

30. The method of claim 29 wherein step (c) is mounting the light source die on and electrically connecting the light source die to the processor and the control circuit.

31. The method of claim 29 wherein step (a) comprises forming a metal pad on the processor, and step (c) comprises electrically connecting one of electrodes of the light source die to the metal pad.

32. The method of claim 29 wherein step (a) comprises forming a metal pad on the control circuit, and step (c) comprises electrically connecting one electrode of the light source die to the metal pad.

33. The method of claim 29 further comprising packaging the detecting die and the light source die in one package.

34. The method of claim 29 further comprising:
    installing a first lens adjacent to the light source die; and
    installing a second lens adjacent to the sensor array.

35. The method of claim 29 wherein step (b) is forming a laser diode (LD).

36. The method of claim 35 wherein step (b) is forming a vertical cavity surface emitting laser (VCSEL) diode.

* * * * *